(12) United States Patent
Aikawa et al.

(10) Patent No.: US 6,555,184 B1
(45) Date of Patent: Apr. 29, 2003

(54) VEHICLE LAMP AND ITS MARKING METHOD

(75) Inventors: Shinji Aikawa, Shizuoka (JP); Koichi Nakamura, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 96 days.

(21) Appl. No.: 09/684,586

(22) Filed: Oct. 6, 2000

(30) Foreign Application Priority Data

Oct. 7, 1999 (JP) ............................................. 11-286310
Aug. 22, 2000 (JP) ........................................ 2000-250833

(51) Int. Cl.[7] ................................................. B05D 3/00
(52) U.S. Cl. ....................... 427/555; 427/596; 427/210; 427/385.5; 427/258; 427/261; 427/264; 427/270; 427/271; 427/412.1
(58) Field of Search ................................ 427/596, 162, 427/164, 271, 555, 216, 385.5, 258, 261, 264, 270, 412.1

(56) References Cited

U.S. PATENT DOCUMENTS 6,356,376 B1 * 3/2002 Tonar et al. ................. 359/267

* cited by examiner

*Primary Examiner*—Cassandra Davis
(74) *Attorney, Agent, or Firm*—Fish & Richardson P.C.

(57) ABSTRACT

A vehicle lamp having a front lens with marks formed by irradiating a laser beam on a surface of the lens is disclosed. The laser beam forms the shapes of a mark, and the mark includes recess grooves. Thus, even in cases where the mark is different in displayed content according to the destination of the lamp, for example, and a lamp certification mark must be formed at the same position of the front lens, the mark can be readily formed by suitably performing irradiation control of the laser beam. The method prevents formation of an outline due to a removable mold insert that appears on the inner surface of the front lens and marks formed in a conventional manner in which the removable insert is used to accommodate the changes of the mark displayed content.

5 Claims, 10 Drawing Sheets

VEHICLE LAMP AND ITS MARKING METHOD

BACKGROUND OF THE INVENTION

1. Field of the Invention

The present invention relates to a vehicle lamp, and in particular to forming a mark on an inner surface of a front lens made of synthetic resin, and its marking method.

2. Description of the Related Art

Figure 10:
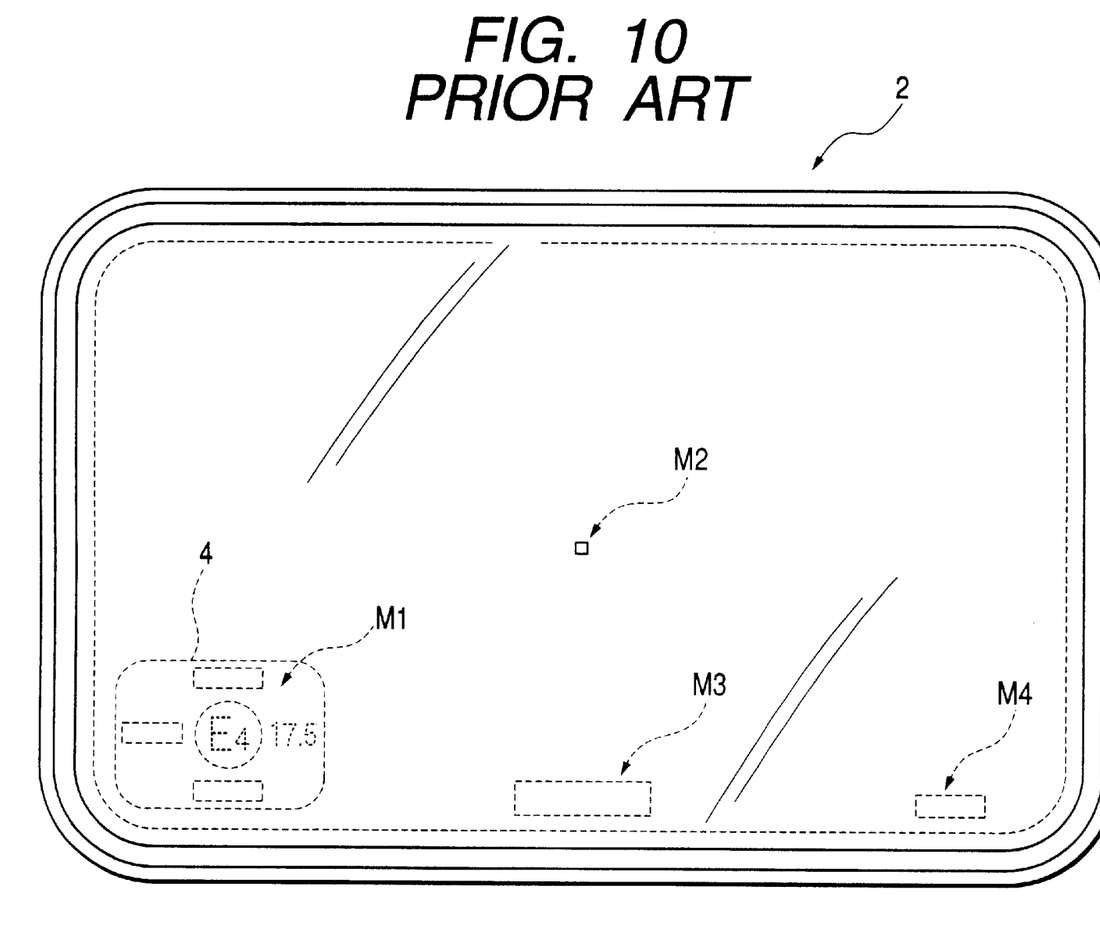
FIG. 10 is a front view of a front lens of a conventional example.

Recently, a front lens made of synthetic resin has been adopted in various vehicle lamp. FIG. 10 depicts an inner surface of a front lens 2 having various marks formed thereon such as a lamp certification mark M1, a lamp center display mark M2, a trade mark M3, a lamp identification mark M4, and the like. These marks were conventionally formed by providing a carved seal on a mold for forming the front lens 2. However, there are cases in which the display content of some marks must change, even for front lenses having the same shape. For example, regarding the lamp certification mark M1, the displayed content of the mark must be changed according to the destination of the lamp (the export country of a vehicle on which the lamp is mounted).

Therefore, for a mark in which the displayed content must be changed, typically a removable insert was prepared for each variation (for example, regarding the lamp certification mark M1, a removable insert was set for each destination), whereby a front lens having the mark of which displayed contents are different was formed with a common mold.

However, in cases where a removable insert is used in order to accommodate changes of the mark displayed content, there is a problem that the outline of the removable insert inevitably appears on the inner surface of front lens. Particularly, in case that the front lens is a transparent lens or a lens similar to the transparent lens, an outline 4 of the removable insert appears conspicuously on the inner surface of the front lens 2, as shown in FIG. 10. Therefore, there is a problem that the appearance of the lamp is deteriorated. The problem also occurs if the mark is formed on an outer surface of the front lens.

SUMMARY OF THE INVENTION

The invention has been made in view of these circumstances, and provides a vehicle lamp in which marks are formed on a surface of a front lens made of synthetic resin, a vehicle lamp in which the marks can be formed without sacrificing the appearance of the lamp, and its marking method.

In order to achieve the above result, the lamp according to the invention does not require use of a removable insert, rather the mark is formed with recess groove by laser beam irradiation. The invention thus concerns a vehicle lamp having a front lens made of synthetic resin of which surface is marked with a predetermined mark, wherein the mark is composed of a recess groove formed by irradiating a laser beam on the surface of the front lens to define the shape of the mark.

The term "vehicle lamp" may be a front lamp or a signal lamp. As long as the "front lens" is made of a synthetic resin and a light-permeable, its material and color are not particularly limited. Further, the front lens may be a lens in which lens elements are formed on its inner surface or a transparent lens.

As long as the above "predetermined mark" can be formed by the irradiation of a laser beam, it is not limited to the specific kind of a mark. The above "irradiation of the laser beam along the shape of the mark", specifically, may be performed by moving the laser beam by scanning, by moving the front lens, or by any combination of them.

As long as the above "laser beam" used for irradiation can form a recess groove on the surface of the lens, the type thereof is not particularly limited. For example, a carbon dioxide laser can be used.

As long as the existence of the mark can be recognized by formation of the recess groove, the size and shape of a section of the above "recess groove" are not particularly limited.

Under the above constitution, in the vehicle lamp according to the invention, the mark is formed on a surface of the front lens made of synthetic resin. This mark is composed of a recess groove formed by irradiating the laser beam on the surface of the front lens corresponding to the shape of the mark. Therefore, the following advantages can be obtained. First, even in a case in which the mark is different in the displayed content, for example, the lamp certification mark must be formed at the same position of the front lens but with different information, such a mark can be readily formed by suitable performing irradiation control of the laser beam. Such operation prevents the occurrence of an outline of the removable insert that appears on the surface of the front lens when a conventional method such as that of the example in which changes of the mark display content are performed using the removable insert are used.

Accordingly, according to the invention, in a vehicle lamp in which the mark is formed on the surface of the front lens made of synthetic resin, the mark can be formed without deteriorating the appearance of the lamp.

The above "mark" may be formed on either of the inner surface or the outer surface of the front lens. If the mark is formed on the inner surface, dust or wax can be prevented from entering the recess groove, which may occur in the case in which it is formed on the outer surface.

The above recess groove may be single or plural. In the case where plural recess grooves are formed at a predetermined small distance and in parallel, the following advantages can be obtained. In the case that the irradiation energy of the laser beam is set to a large value in some degree, the existence of the mark can be sufficiently recognized even if only a single recess groove is formed. However, in this case, there is concern that smoke may be produced by the irradiation energy of the laser beam when the recess groove is formed. If smoke is produced, particles of smoke may adhere to the surface of the front lens, which could cause a blurring or fogging of the front lens. Therefore, plural recess grooves may be formed at the performed small distance and in parallel with a laser beam with small radiation energy that is too small to produce smoke, and the existence of the mark can still be recognized. Thus, it is possible to prevent particles of smoke from adhering to the surface of the front lens.

Further, since the laser beam irradiation can be performed with small irradiation energy, there is no concern that the color of the recess groove changes into yellow or that foaming is produced in the recess groove. Therefore, the appearance of the lamp can be improved.

The mark formed on the surface of the front lens may have some intersecting points (corner points or junctions). Since the irradiation energy of the laser beam concentrates onto intersecting points, smoke may be produced from the intersecting points. Therefore, if the recess grooves are formed so as to break off at the positions of the intersecting points, it is possible to prevent smoke from being produced from the intersecting points by the laser beam irradiation. Therefore, it is possible to prevent particles of smoke from adhering to the surface of the front lens.

A hard coating film is frequently formed on the outer surface of the front lens to prevent the front lens from being damaged. In case that a mark is formed on the inner surface of the lens, if the laser beam irradiation is performed after the hard coat processing is provided on the lens, it is possible to prevent a jig for supporting the front lens from coming into contact and scratching the outer surface of the front lens because the hard coating film has been formed.

Further, in case that the front lens is made of polycarbonate resin, when a mark is formed on its inner surface, the laser beam irradiation is performed in state where the inner surface of the front lens faces downward. Therefore, even if smoke is produced by the laser beam irradiation energy, since the particles of smoke produced from the polycarbonate resin are heavier than air, the particles descend. Therefore it is possible to prevent smoke particles from adhering to the surface of the front lens.

In case that the mark is formed on the inner surface of the front lens, the following advantages can be obtained by forming an antifogging coating film on the inner surface. First, if an antifogging coating film is formed on the inner surface of the front lens, the existence of the antifogging coating film prevents particles of smoke from adhering to the inner surface of the front lens even when smoke is generated during laser beam irradiation. Owing to this, it is possible to set the irradiation energy of the laser beam to a high value: therefore, it is possible to recognize the existence of a mark even with one recess groove. In this case, the laser beam irradiation is performed after the antifogging coating film is formed on the inner surface of the front lens. If the antifogging coating film is formed after the hard coat processing on the outer surface of the front lens, it is possible to prevent jigs for supporting the front lens from coming into contact and scratching the outer surface of the front lens because the hard coating film has already been formed.

In case that the laser beam irradiation is performed after the antifogging coating film is formed, the antifogging coating film is removed in a portion where the laser beam is irradiated. However, there is no concern that the appearance of the lamp is deteriorated even if particles of smoke do adhere on the removed portion since the portion where the laser beam is irradiated is the portion constituting the mark.

DETAILED DESCRIPTION

Embodiments of the invention will be described below with reference to drawings.

Figure 1:
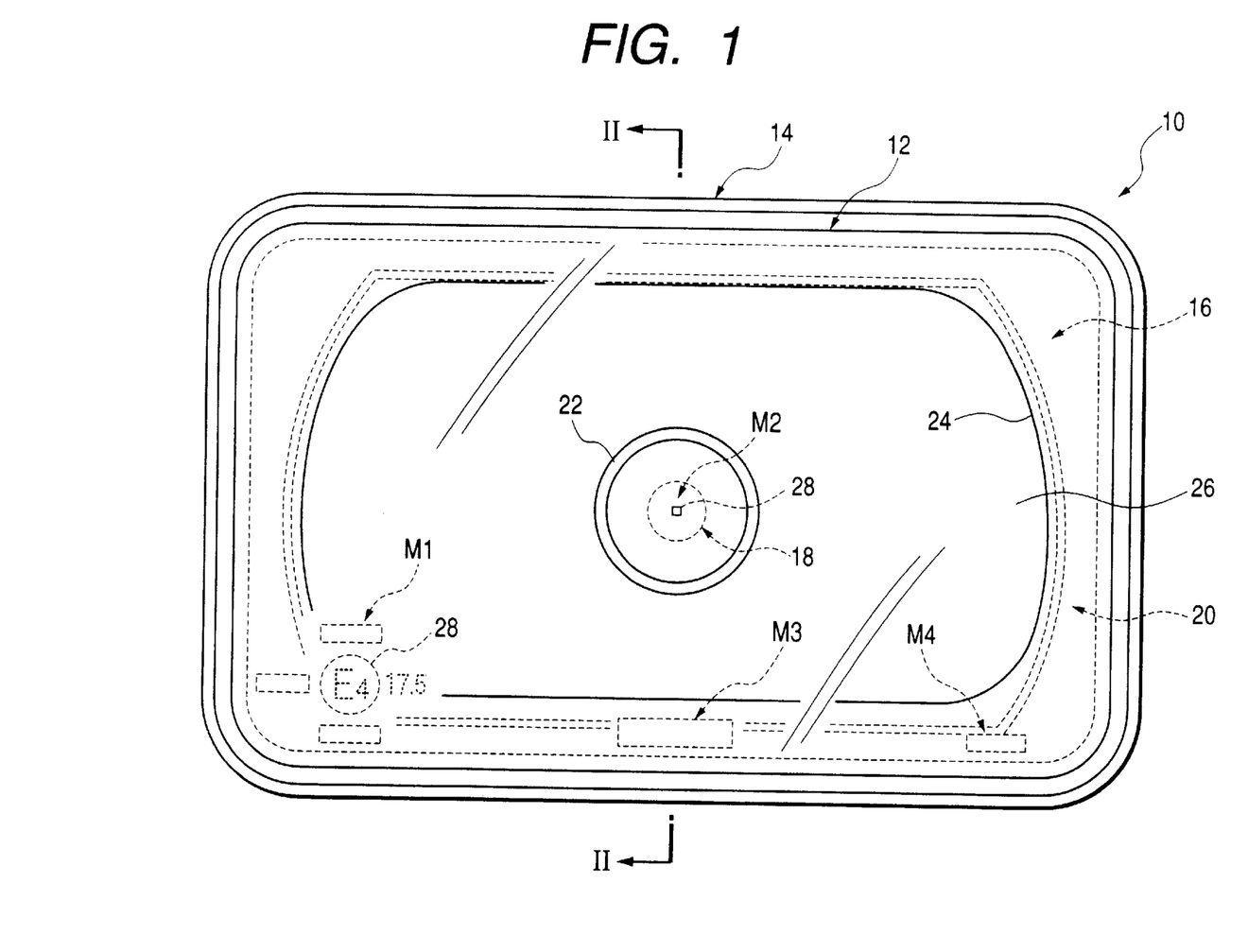
FIG. 1 is a front view showing a vehicle lamp according to a first embodiment of the invention.
Figure 2:
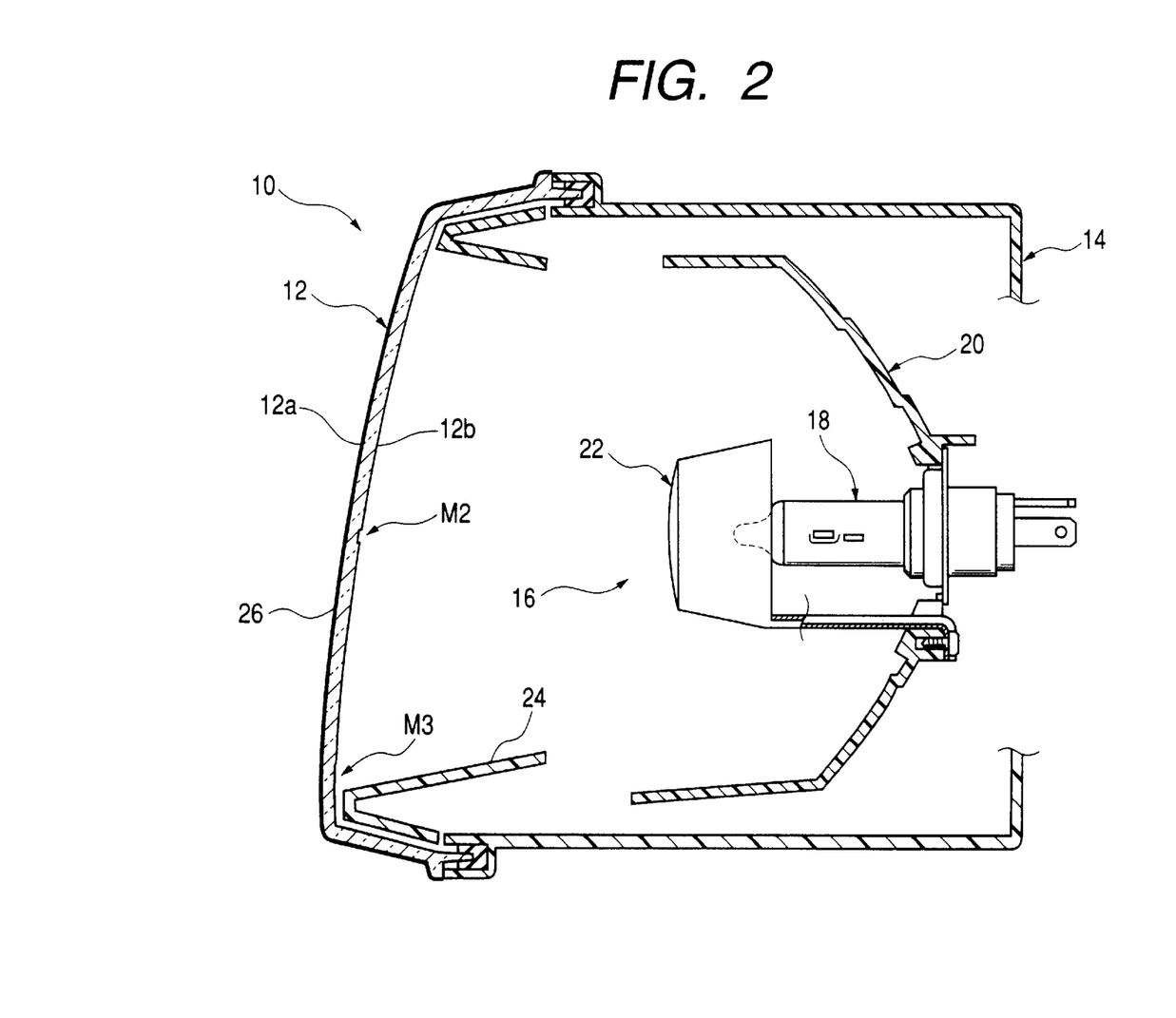
FIG. 2 is a sectional view taken along a line II—II in FIG. 1.

FIG. 1 is a front view showing a vehicle lamp according to a first embodiment of the invention, and FIG. 2 is a sectional view taken along a line II—II of FIG. 1. As shown in these figures, a vehicle lamp 10 according to the first embodiment is a headlamp, in which a reflector unit 16 is provided within a lamp chamber formed by a front lens 12 and a lamp body 14 so that it can tilt up and down and left and right, and an extension 24 is provided in front of the reflector unit 16.

The reflector unit 16 comprises a light source bulb 18, a reflector 20, and a shade 22. The luminous intensity distribution pattern of the front lamp is formed by the reflector unit 16. Therefore, the front lens 12 is composed of a transparent lens.

The front lens 12 is made of polycarbonate resin, and has an outer surface 12a on which a hard coating film 26 is formed and an inner surface 12b on which four marks M1, M2, M3, and M4 are formed. The mark M1 is a lamp certification mark that is formed at a left lower portion of the front lens 12; the mark M2 is a lamp center display mark that is formed in the center of the front lens 12; the mark M3 is a trade mark that is formed at the center lower portion of the front lens 12; and the mark M4 is a lamp identification mark that is formed at a right lower portion of the front lens 12. Regarding a part of the mark M1, and the marks M3 and M4, only their marking positions are shown with a rectangular frame in FIG. 1. Each of these four marks M1, M2, M3, and M4 includes a recess groove 28 formed by irradiating a laser beam on the inner surface 12b of the front lens 12 along the shape of the mark.

Figure 3A:
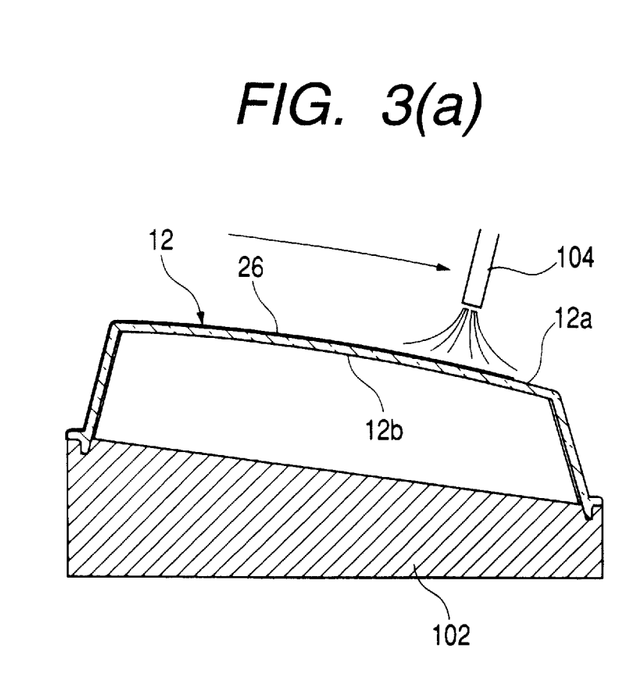
FIG. 3(a) is a sectional view showing hard coat processing in a front lens of the vehicle lamp according to the first embodiment of the invention.
Figure 3B:
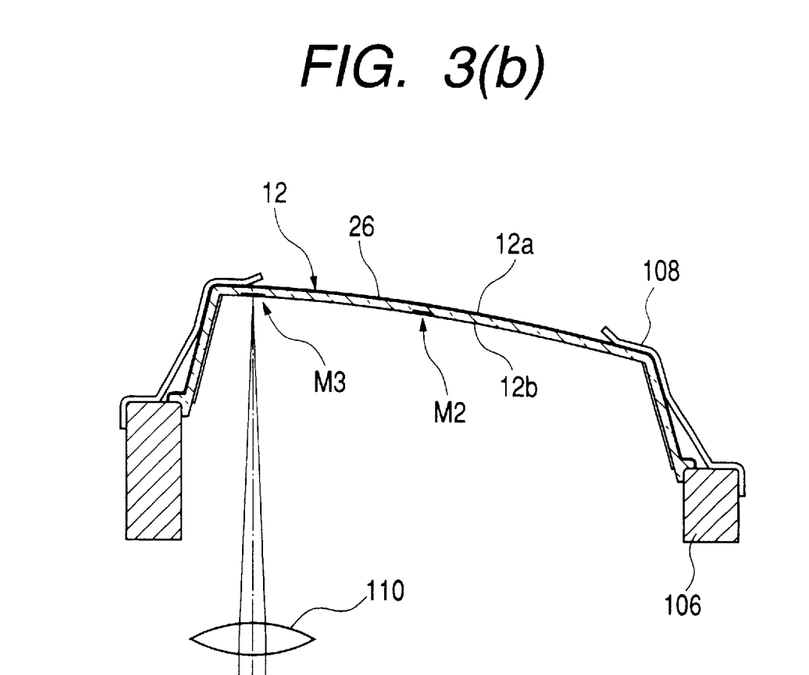
FIG. 3(b) is a sectional view showing marking processing in a front lens of the vehicle lamp according to the first embodiment of the invention.

FIGS. 3(a) and 3(b) are sectional views for illustrating the states of hard coat processing and marking processing. As shown in FIG. 3(a), in a state where the front lens 12 is placed and positioned on a receiver jig 102 in such a manner that the outer surface 12a faces upward, the hard coat processing is performed by blowing film for hard coat upon the outer surface 12a from a coating nozzle 104 while the coating nozzle 104 is being moved along the outer surface 12a of the front lens 12. Further, as shown in FIG. 3(b), the front lens 12 on which the hard coating film 26 has been formed by the above hard coat processing is placed on a receiver jig 106 in such a manner that its outer surface 12a faces upward (that is, the inner surface 12b faces downward), and the front lens 12 is positioned by pressing a periphery of the outer surface 12a of the front lens 12 by a press jig 108. In this state, marking processing is performed by irradiating the inner surface 12*b* of the front lens 12 from the lower side with a laser beam at the predetermined mark forming position. This laser beam irradiation is performed by scanning the laser beam along the shape of the mark in a state where a condensing lens (fθ lens) 110 of a laser optical systems is moved to position opposite each mark. This laser beam scanning is performed in accordance with a scanning program set in a marking control means (not shown) for each mark. Further, in the above laser optical system, alignment is performed in such a manner that the diameter of a laser beam spot formed on the inner surface 12*b* of the front lens 12 by the condensing lens 110 is about 0.15 mm. The laser beam irradiation time necessary to form the recess groove 28 for each mark is within several seconds, even for forming the recess groove 28 of the lamp certification mark M1 which is the most complicated.

The laser used for the above laser beam irradiation is a carbon dioxide laser having an oscillating wavelength of 10.6 μm. Though maximum output of this laser is about, 12 W, the laser beam irradiation is performed at about 7.2 W output in order not to make the irradiation energy too large.

Figure 4:
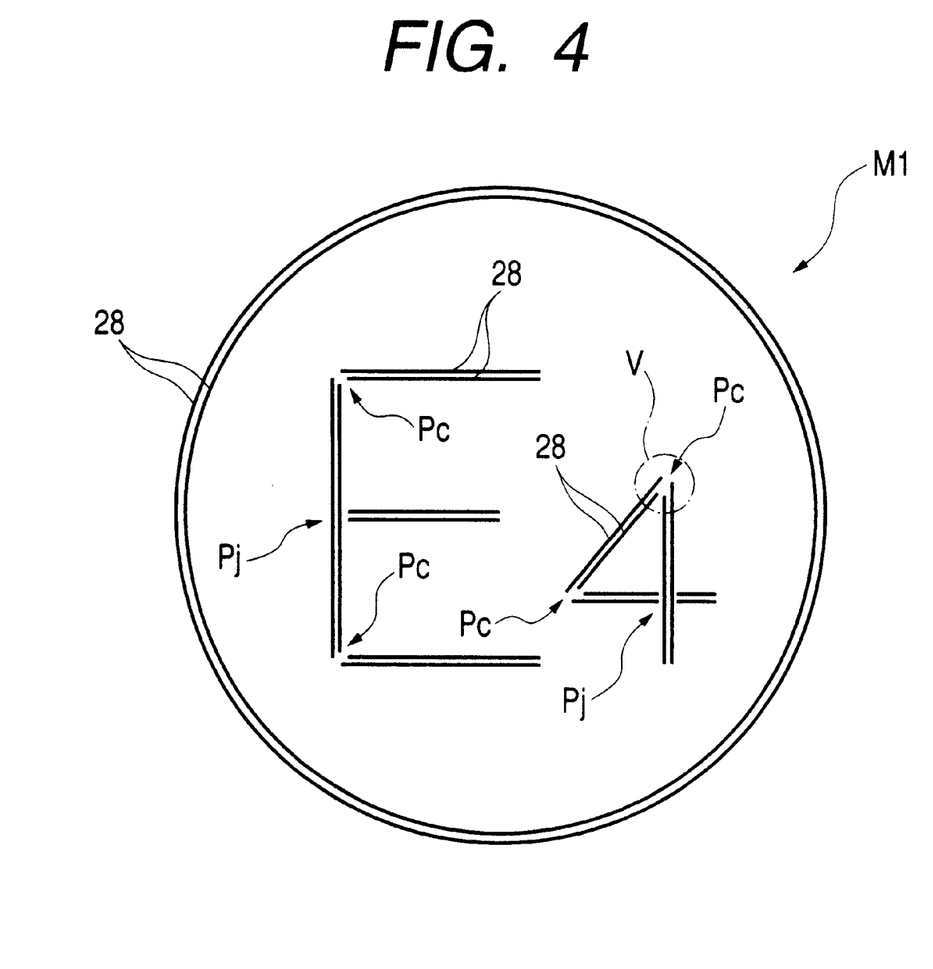
FIG. 4 is a partially enlarged view of a lamp certification mark formed on an inner surface of the front is lens according to the first embodiment of the invention.
Figure 5:
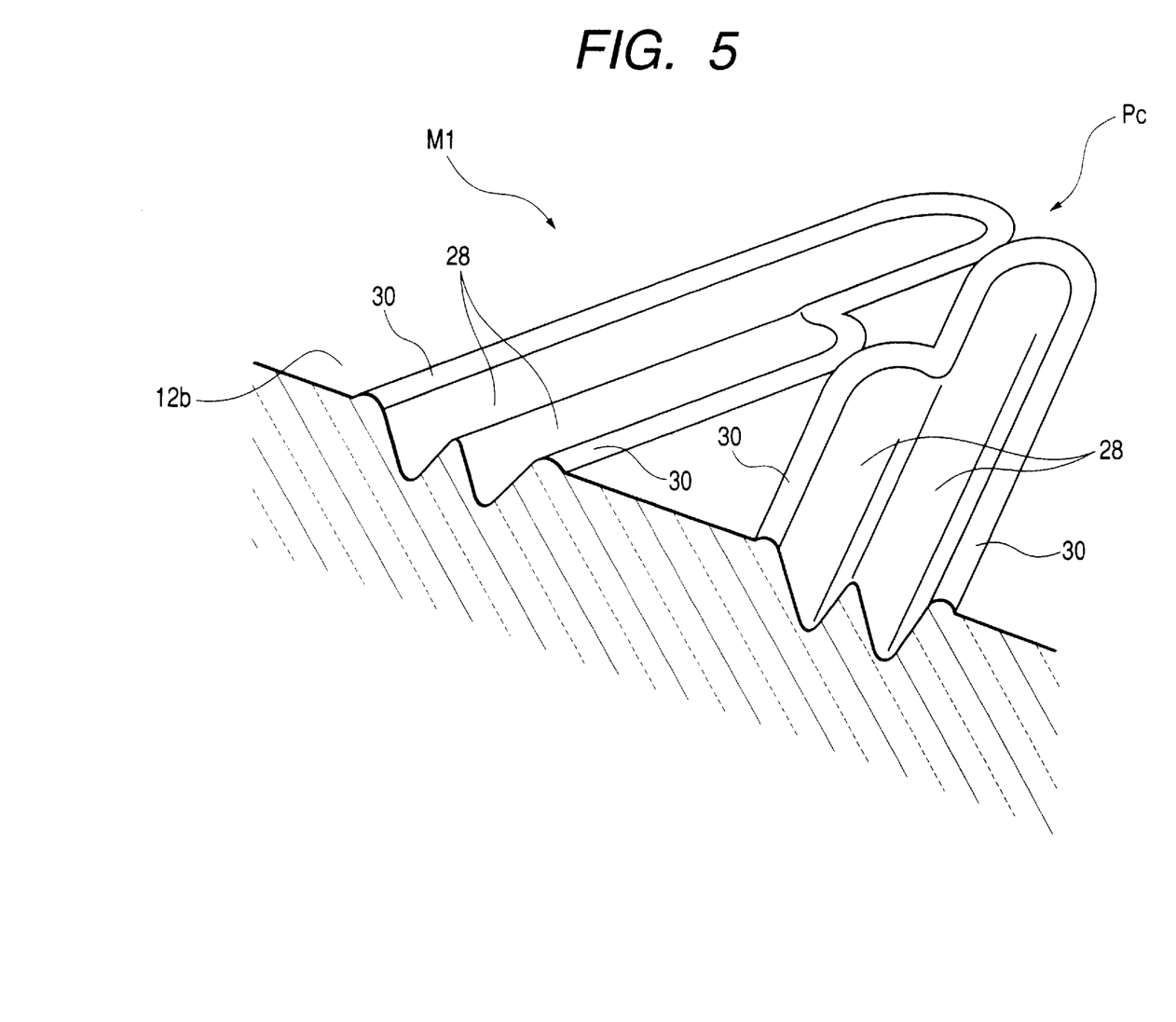
FIG. 5 is an enlarged perspective view of portion V of FIG. 4, viewed from the inner surface side.

FIG. 4 is a partially enlarged diagram of the lamp certification mark M1, and FIG. 5 is an enlarged perspective view of a portion V of FIG. 4, viewed from the inner surface side. As shown in these figures, the two recess grooves 28 form the lamp certification mark M1, and they are formed at a predetermined small distance and in parallel with each other. Specifically, both recess grooves 28 are formed so that the distance between their centers is about 0.15 mm. The width of each of these recess grooves 28 is about 0.15 mm from the viewpoint that the beam spot diameter of the laser beam is about 0.15 mm. Since the distance between the centers of the two recess grooves 28 is about 0.15 mm, the two recess grooves 28 are formed so as to contact with each other, and thus the whole width is about 0.3 mm. Further, on both sides of the recess grooves 28, there are formed protrusions 30 that are somewhat protuberant due to the laser beam irradiation.

The lamp certification mark M1 has plural intersecting points (that is, corner points Pc and junction Pj), and the recess grooves 28 break off at positions of these intersecting points. For example, at a corner point Pc, the recess grooves are formed so that the end portions of straight lines that face the intersecting point break off. At the point Pj where the recess grooves cross in the shape of T or crosswise, the recess grooves are formed so that one of the crossing straight lines is kept intact and the other straight line breaks off near the intact straight line.

If the recess grooves 28 did not break off at the positions of the intersecting points, the scanning speed of the laser beam would become slow at the corner points Pc, and the laser beam would be repeatedly scanned in a short time at the junction Pj, whereby the irradiation energy of the laser beam would be more concentrated onto each intersecting point than onto the other portions and therefore smoke would easily be produced from the intersecting points. In order to prevent such a smoke condition from occurring, the recess grooves 28 are so constituted that they break off at the position of each intersecting point.

When the recess grooves 28 are so constituted that they break off at the position of each intersecting point, the gap of the broken-off portion is extremely small, so that the lighting member certification mark M1 is readable and does not appear to be unnatural. Particularly, in the first embodiment, at the corner point Pc, the two recess grooves 28 do not break off at the same position, that is, the recess groove 28 on the outside portion is longer than the recess groove 28 on the inside portion. Therefore, the gap of the broken-off portion is substantially uniform as a whole, so that the lighting member certification mark M1 can be easily read. Further, since the protrusions 30 are formed on both sides of two recess grooves 28, the two recess grooves 28 can be observed by the naked eye in such a manner they appear linked to each other. Other portions of the lamp certification mark M1 are shown in FIG. 4, and the other marks M2, M3 and M4 respectively also include the two recess grooves 28 formed by the laser beam irradiation.

As described above, in the vehicle lamp 10 according to the first embodiment, the four marks M1, M2, M3 and M4 are formed on the inner surface 12*b* of the front lens 12 made of synthetic resin. Each of these marks comprises the recess grooves 28 formed by irradiating the laser beam on the inner surface 12*b* of the front lens 12 to form the shape of the mark. Therefore, different effects can be obtained. For example, regarding the lamp certification mark M1, different displayed content according to the destination of the lamp must be formed at the same position of the front lens 12 for each lamp. Marks can be readily formed with different destination information by suitably performing irradiation control of the laser beam. By doing so, an outline of a removable mold insert is prevented from appearing on the inner surface of the front lens which occurs in the conventional example in which the change of the mark displayed content is performed using a removable insert. Further, the marks M2, M3 and M4 other than the lamp certification mark M1 may also be formed by the laser beam irradiation. Therefore, each mark can be seen similarly. Accordingly, according to the first embodiment, in the vehicle lamp in which the marks are formed on the inner surface of the front lens made of the synthetic resin, the marks can be formed without adversely affecting the appearance of the lamp.

Further, in the first embodiment, since the two recess grooves 28 are formed at the predetermined small distance and in parallel, even if the laser beam is irradiated with a small irradiation energy such that smoke is not produced, the existence of the mark can be recognized. Thus, it is possible to prevent particles of smoke from adhering to the inner surface 12*b* of the front lens 12 and prevent a blurring or fogging condition from being produced on the front lens 12. Further, since the laser beam irradiation can be performed with the small irradiation energy, there is no concern that the color of the recess groove 28 would change into yellow or that foaming may be produced in the recess groove 28. Consequently, the appearance of the lamp can be improved.

Three or more recess grooves 28 may be formed at the predetermined small distance and in parallel. In this case, although more time is required for the marking processing, the laser beam irradiation can be performed with a smaller irradiation energy.

In addition, in the first embodiment, the recess grooves 28 are formed so as to break off at the positions of intersecting points of the mark to prevent smoke from being produced due to the concentration of the laser beam irradiation energy. In this manner, it is possible to prevent smoke particles from adhering to the inner surface 12*b* of the front lens 12.

The above effects can be similarly obtained also in the case wherein the four marks M1, M2, M3 and M4 are formed on the outer surface 12*a* of the front lens 12. When the four marks M1, M2, M3 and M4 are formed on the inner surface 12*b* of the front lens 12 as in the first embodiment, the dust or wax are prevented from entering into their recess grooves 28.

In the vehicle lamp 10 according to the first embodiment, the hard coating film 26 is formed on the outer surface 12a of the front lens 12. Since the marking processing (laser beam irradiation) is performed after the hard coat processing in the first embodiment, it is possible to prevent the press jig 108 from contacting and scratching the outer surface 12a of the front lens 12 because it is protected by the hard coating film.

The front lens 12 of the vehicle lamp 10 according to the first embodiment is made of polycarbonate resin, and the laser beam irradiation is performed in a state where the inner surface 12b of the front lens 12 faces downward. Therefore, even if smoke is produced by the laser beam irradiation energy, the smoke particles produced from the polycarbonate resin are heavier than air and descend. Therefore, it is possible to prevent the particles of the smoke from adhering to the inner surface 12b of the front lens 12.

Figure 6:
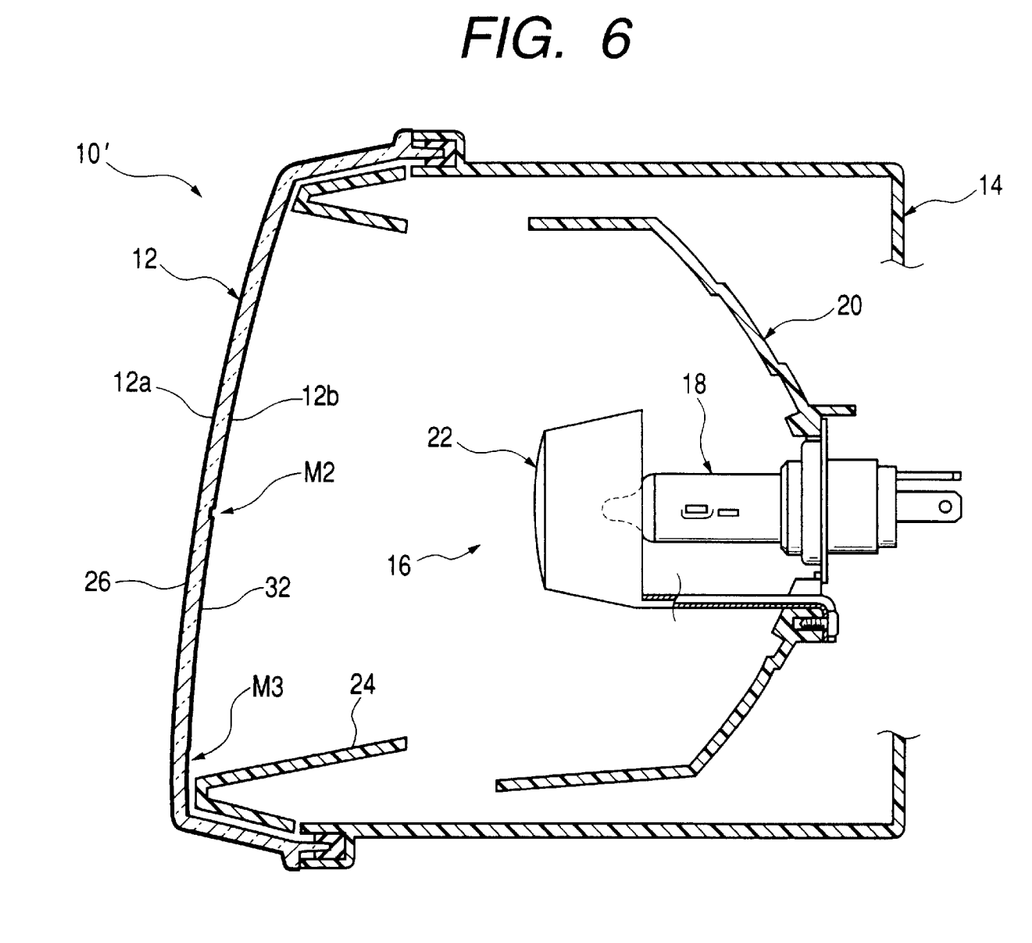
FIG. 6 is a view showing a vehicle lamp according to a second embodiment of the invention which is similar to FIG. 2.

FIG. 6 shows a vehicle lamp according to a second embodiment of the invention, which is similar to FIG. 2. A vehicle lamp 10' according to the second embodiment is composed of the same components as the one shown in the first embodiment except for the front lens 12. The front lens 12 shares some of the same features as the one in the first embodiment in that it is made of polycarbonate resin, and has an outer surface 12a on which a hard coating film 26 is formed and an inner surface 12b on which four marks M1, M2, M3, and M4 (M1 and M4 are not shown) are formed. However, the second embodiment is different from the first embodiment in that an antifogging coating film 32 is formed on the inner surface 12b of the front lens 12.

Figure 7A:
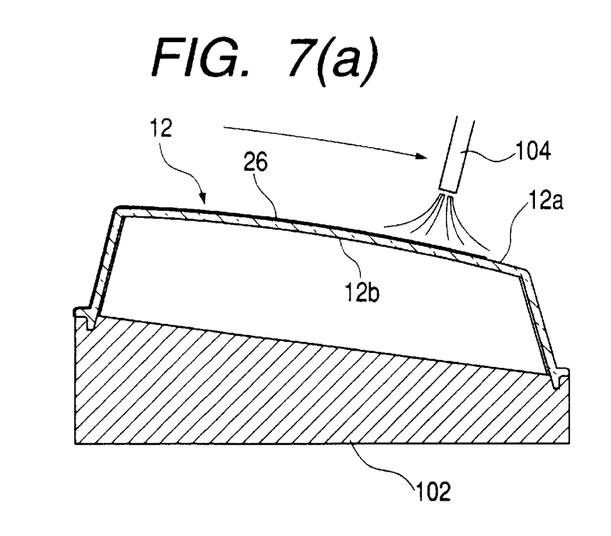
FIG. 7(a) is a sectional view showing hard coat processing in a front lens of the vehicle lamp according to the second embodiment of the invention.
Figure 7B:
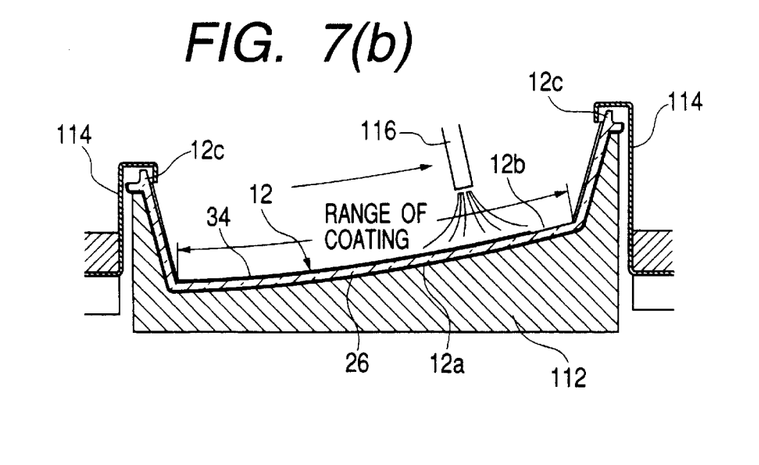
FIG. 7(b) is a sectional view showing antifogging coat processing in a front lens of the vehicle lamp according to the second embodiment of the invention.
Figure 7C:
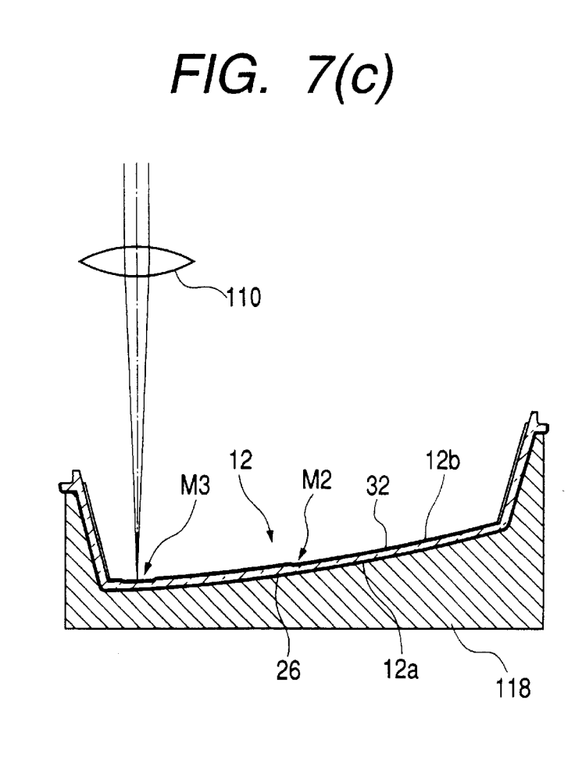
FIG. 7(c) is a sectional viewed showing marking processing in a front lens of the vehicle lamp according to the second embodiment of the invention.

FIGS. 7(a) to 7(c) are cross sectional views showing the states of hard coat processing, antifogging coat processing, and marking processing. As shown in FIG. 7(a), the hard processing is similar to the one described in the first embodiment. That is, the front lens 12 is placed and positioned on a receiver jig 102 in such a manner that the outer surface 12a faces upward, and the hard coat processing is performed by blowing film paint for hard coat upon the outer surface 12a from a coating nozzle 104 while the coating nozzle 104 is being moved along the outer surface 12a of the front lens 12. As shown in FIG. 7(b), the antifogging coat processing is performed on the front lens 12, on which the hard coating film 26 is formed by the hard coat processing. For the antifogging coat processing, the front lens 12 is placed and positioned on a receiver jig 112 in such a manner that the inner surface 12b faces upward. Then, in a state where a seal leg portion 12c is covered with a masking jig 114, the antifogging coat processing is performed by blowing material for the antifogging coat upon the inner surface 12b from a coating nozzle 116 while the coating nozzle 116 is being moved along the inner surface 12b of the front lens 12. The material for the antifogging coat consists of main, hardening and diluting agents whose compounding ratio is set at, for example, 10:1:6–9. The main agent essentially consists of hydrophilic acrylic resin and a surface-active agent, and the hydrophilic acrylic resin is a compound of a hydrophilic portion and a hydrophobic portion that sticks to the inner surface 12b of the front lens 12.

As shown in FIG. 7(c), marking process is performed on the front lens 12, on which the antifogging coating film 32 has been formed by the antifogging coat processing and heated to dry. For the marking processing, the front lens 12 is placed and positioned on a receiver jig 118 in such a manner that the inner surface 12b faces upward. Then, making processing is performed by adjusting the laser beam to irradiate at the predetermined mark forming position in the inner surface 12b of the front lens 12 from the upper side. The laser beam irradiation is performed the same as in the first embodiment, that is, by scanning the laser beam along the shape of the mark in a state where a condensing lens (fθ lens) 110 of a laser optical system is moved to a position opposite to each mark.

Figure 8:
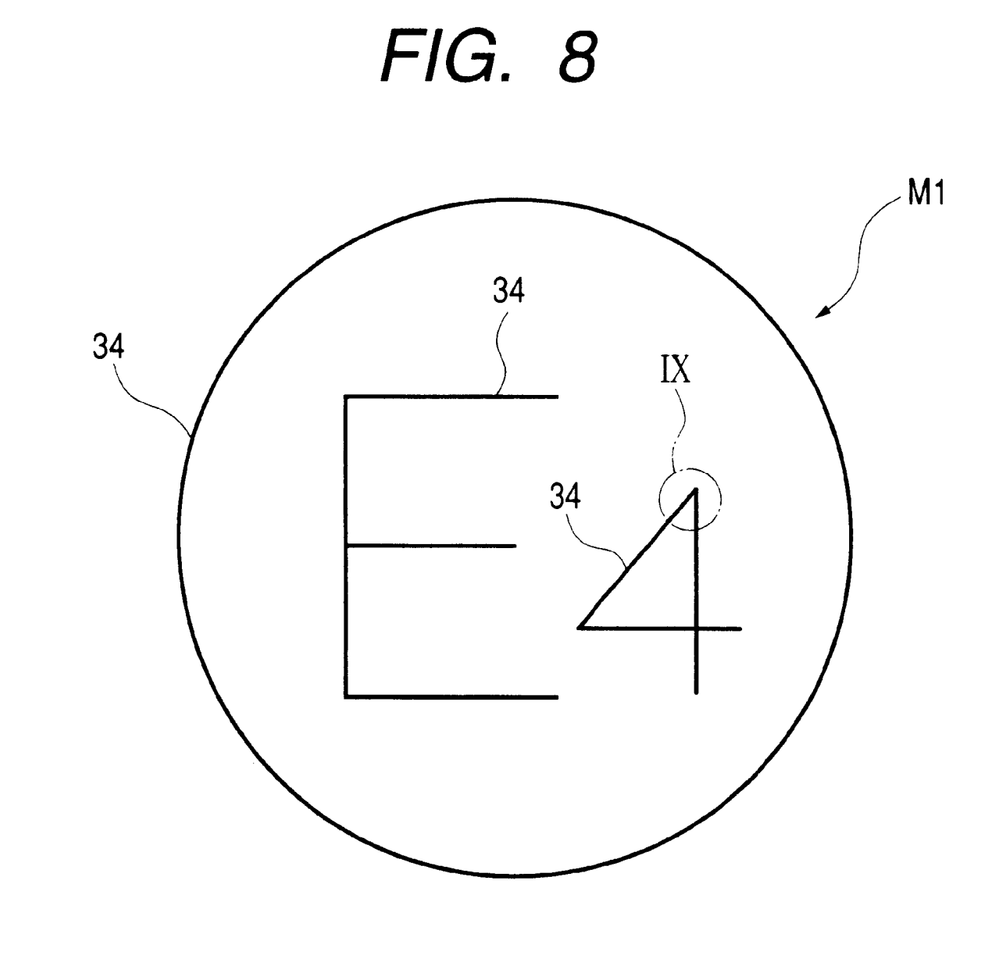
FIG. 8 is a partially enlarged view of a lamp certification mark formed on an inner surface of the front lens according to the second embodiment of the invention.
Figure 9:
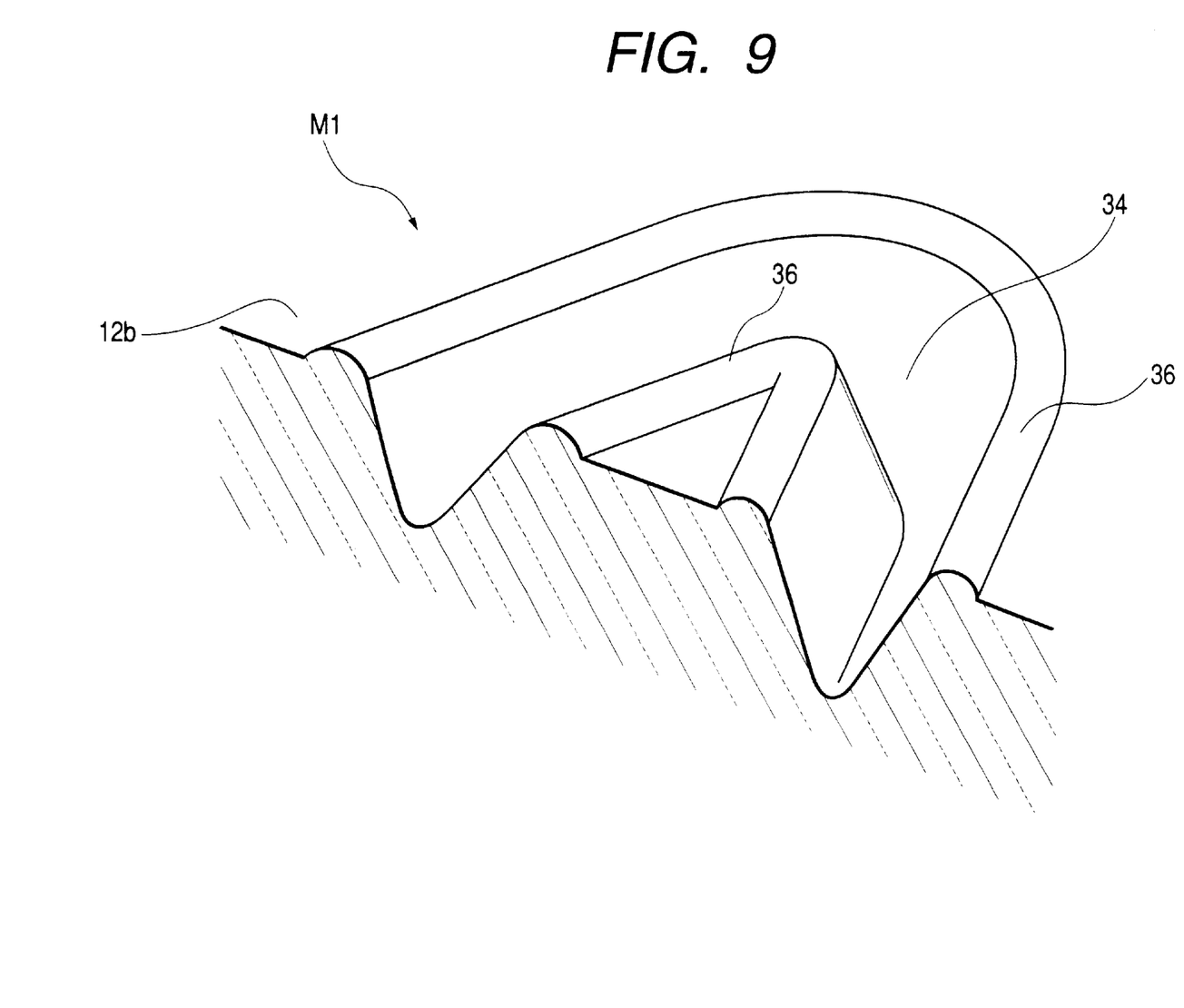
FIG. 9 is an enlarged perspective view of portion IX of FIG. 8, viewed from the inner surface side.

FIG. 8 is a partially enlarged diagram of the lamp certification mark M1, which is formed on the inner surface 12b of the front lens 12 in the vehicle lamp 10' according to the second embodiment. FIG. 9 is an enlarged perspective view of a portion IX of FIG. 8, viewed from the inner surface side. As shown in these figures, the lamp certification mark M1 of the second embodiment comprises one recess groove 34, and the recess groove 34 is not broken off even at positions of the interesting points of the mark. On the both sides of the recess groove 34, there are formed protrusions 36 that are somewhat protuberant due to the insert beam irradiation. Marks M2, M3, and M4 other than the lamp coefficient mark M1 also comprise one recess groove 34 formed by the laser beam irradiation.

As described in detail, the vehicle lamp 10' according to the second embodiment comprises the inner surface 12b of the front lens 12, on which four marks M1, M2, M3, M4 are formed, with antifogging coating film 32 thereon. Therefore, different effects can be obtained. For example, the case where the laser beam irradiation for marking processing is performed after antifogging processing on the inner surface 12b of the front lens 12, the existence of the antifogging coating film 32 prevents particles of smoke from adhering to the inner surface 12b of the front lens 12 even if smoke is generated during the laser beam irradiation. Owing to this, it is possible to set the irradiation energy of the laser beam to a high value; therefore, it is possible to recognize the existence of the marks M1, M2, M3, and M4 by cutting only one recess groove 34.

If the laser beam irradiation is performed after the antifogging coat processing, the antifogging coating film 32 is removed in those portions on which the laser beam is irradiated. However, there is no concern that the appearance of the lamp is deteriorated even if the particles of the smoke are adhered on the portion, i.e. the recess groove 34, since the portion where the laser beam is irradiated is the recess groove 34 constituting the marks M1, M2, M3, and M4.

In the second embodiment, since hard coat processing is performed on the outer surface 12a of the front lens 12 before antifogging coat processing, it is possible to prevent the receiver jigs 112, 118 for supporting the front lens 12 from coming into contact and scratching the outer surface 12a of the front lens 12 because the hard coating film has been formed at the time of the antifogging processing and the laser beam irradiation.

In the described embodiments of the invention, the vehicle lamps 10, 10' are headlamps. However, similar effects as those described in the above embodiments can be obtained with vehicle lamps of other kinds by adopting a similar constitution.

What is claimed is:

1. A method for forming a mark on a lens of a vehicle lamp comprising:

forming a hard coating film on an outer surface of the lens; and irradiating a laser beam on an inner surface of the lens to create the mark after hard coat processing is completed.

2. The method for forming a mark according to claim 1, wherein the lens is made of polycarbonate resin and arranged so that the inner surface thereof faces downward.

3. The method according to claim 2, wherein an antifogging coating film is formed on the inner surface of the lens before the mark is created.

4. The method for forming a mark according to claim 1, further comprising:

coating an inner surface of the lens with an antifogging coating film, wherein the laser beam irradiation is performed after the antifogging coating film has been applied.

5. The marking method according to claim 4, further comprising conducting hard coat processing on the outer surface of the lens before applying the antifogging coating.

* * * * *